F. B. BLAKEMORE.
SPEED SIGNALING SYSTEM.
APPLICATION FILED OCT. 12, 1916.
1,310,778. Patented July 22, 1919.
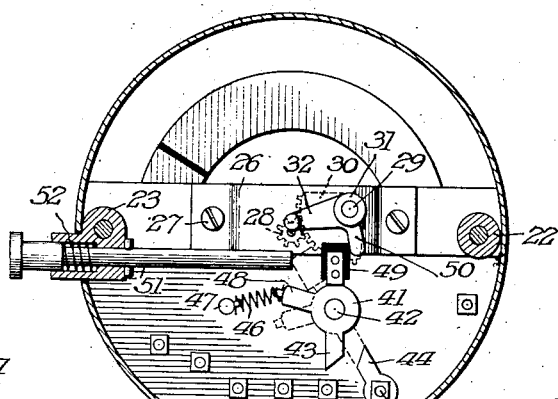
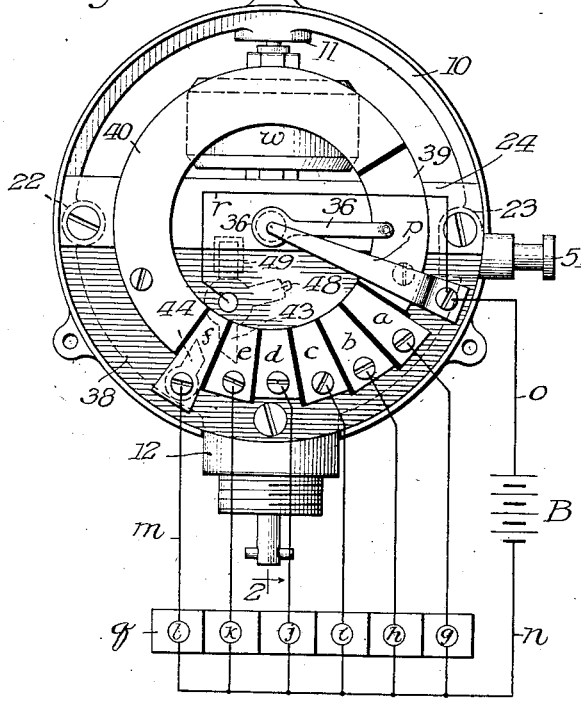
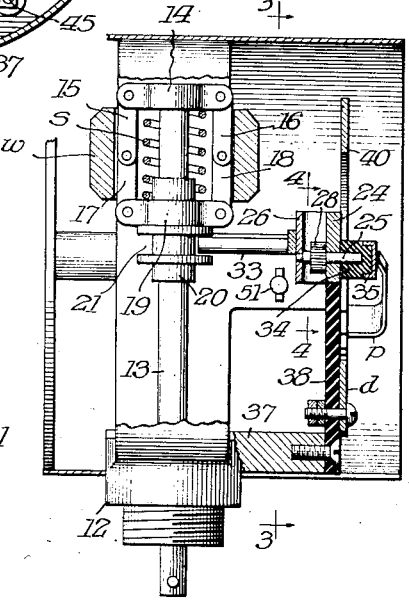
Inventor
F. Bruce Blakemore
By James R. Offield,
Atty
Witness:
Leonard W. Novander.

UNITED STATES PATENT OFFICE.

FRANK BRUCE BLAKEMORE, OF CHICAGO, ILLINOIS.

SPEED-SIGNALING SYSTEM.

1,310,778.  Specification of Letters Patent.  Patented July 22, 1919.

Application filed October 12, 1916. Serial No. 125,166.

*To all whom it may concern:*

Be it known that I, FRANK BRUCE BLAKEMORE, a citizen of the United States, and a resident of Chicago, in the county of Cook and State of Illinois, have invented certain new and useful Improvements in Speed-Signaling Systems, of which the following is a specification.

My invention relates to speed signaling systems which give indication of the speed of a vehicle to persons outside of the vehicle, as for example, traffic officers.

The main object of my invention is to provide an improved signaling system in which a signal device is brought into speed indicating condition when the vehicle reaches a certain speed and is held in indicating condition independently of the speed of the vehicle thereafter. Another object of the invention is to provide an improved arrangement which will make it necessary for the driver to stop and leave the vehicle before he can effect re-setting to restore the held signal to the control of the vehicle.

On the accompanying drawings I illustrate a system embodying the various features of my invention, and in these drawings—

Figure 1 is a front elevational view of a speed control electric circuit controlling device together with signaling circuits and speed indicating devices.

Fig. 2 is a sectional view on plane 2—2, Fig. 1.

Fig. 3 is a sectional view on plane 3—3, Fig. 2, and

Fig. 4 is a sectional view on plane 4—4, Fig. 2.

A circular band 10 has the upper pivot hub 11 and the lower supporting hub 12, a vertical diametrally extending shaft 13 being rotatably supported in the lower hub 12 and bearing in the upper pivot hub 11. At its lower end the shaft is adapted for connection with a flexible shaft connected with a running wheel of a vehicle, in the ordinary manner. Secured to the upper end of the shaft is a collar 14 pivoting at diametrally opposite points the links 15 and 16, these links being pivoted to the upper ends of links 17 and 18 which at their lower ends pivot at diametrally opposite points to a collar 19 longitudinally slidable on the shaft 13 and carrying the sleeve 20 having the circumferential groove 21. Weights $w$ are secured to the links in such manner that when the shaft is rotated centrifugal force will cause the weights to fly out to swing the upper and lower links into angles with each other and to raise the sleeve 20 against the force of compression spring $s$, the arrangement constituting ordinary well known flyball governor mechanism. Extending forwardly from the band 10 at opposite sides thereof are the lugs 22 and 23 to whose front end is secured the horizontal diametral crossbar 24. At a central point this bar pivots the front end of the arbor 25 whose rear end pivots in the bridge plate 26 secured against the rear of the bar 24 by screws 27. Between the bar and bridge the arbor 25 carries a gear pinion 28. To one side of the arbor 25 an arbor 29 is journaled in the bridge plate and bar and supports a gear segment 30 which meshes with the pinion 28. The inner end of the arbor supports a hub 31 from which an arm 32 extends radially and from the end of which arm a pin 33 extends axially into the groove 21 of the sleeve 20 on the shaft 13. Secured to the outer end of the arbor 25 to rotate therewith is a block 34 of insulating material to which is secured the metallic hub 35 from which extends the contact arm 36. With the arrangement above described, when the vehicle travels the shaft 13 is rotated and the sleeve 20 is shifted up and down on the shaft according to the speed of the vehicle, and such up and down movement is communicated to the pin 33 and arm 32 and the arbor 29 with the gear segment is rotated and the pinion 28 and arbor 25 are rotated and the contact arm 36 is swung around.

Extending forwardly from the hub 12 is a lug 37 to whose front end is secured a plate 38 of insulating material, the plate being semi-circular and extending radially upwardly to the bar 24. Secured on this plate but insulated from each other are contact segments $a$, $b$, $c$, $d$, $e$ and $f$ with which the arm 36 successively engages as it swings during travel of the vehicle. The engagement of the contact arm 36 with the contact segments controls electrical circuits for a number of electrical signaling devices such as lamps $g$, $h$, $i$, $j$, $k$ and $l$, each segment being connected by a conductor $m$ with one terminal of the respective lamp, the other terminals of the lamps being connected to a common conductor $n$ which leads to one terminal of a battery B. The other terminal of the battery is connected by a conductor $o$ with a contact spring *p* secured to the insulating plate or base 38 and contacting at its end against the hub 35 of the arm 36. Thus when the arm contacts with any of the segments the corresponding lamp circuit will be closed and the lamp will be illuminated. In practice the lamps may be mounted in a suitable housing *q* and in order to represent different speeds the lamps may be differently colored, or transparent colored plates may be provided on the container in front of the lamps. The speed indications may be graded as desired. For example, the contact segment *a* may be the five mile contact and the lamp *g* may be white to indicate such speed. The last segment *f* may be the twenty-five mile or maximum speed segment and the lamp *l* may be red. Then, as the vehicle travels and the contact arm 36 is carried along the segments the lamps will light and their color will be indicative of the speed at which the vehicle is traveling. A contact segment 39 may be provided for the arm 36 to rest against when the vehicle is at rest, and the segment 40 may be provided for the arm to travel over after the maximum speed *f* has been passed. These contact segments are not connected in circuit.

In the arrangement thus far described, speed indication will be given by the lamps only while the vehicle is traveling. It is very desirable that indication be available to outsiders, as for example traffic officers, of the speed at which the vehicle has been running before slowing up or coming to a stop. The principal object of my invention is therefore to provide an improved construction and arrangement which, when the vehicle has been running beyond a legal speed, will maintain the corresponding lamp or other signal device in indicating condition even though the vehicle slows up or comes to a stop so that indication will be given of the unlawful speed. Preferably a short circuit is provided around the maximum speed contact and the contact arm for thereafter holding the indicating circuit closed independently of the movements of the arm or speed of the vehicle. Contact mechanism is provided for the short circuit and is arranged to be under control of the vehicle to close the maximum speed circuit at the same time that the contact arm closes said circuit, but after such closure of the short circuit it will no longer be under control of the vehicle, the arrangement being such that opening of the short circuit can be effected only manually by the driver after he leaves the vehicle. Referring to the drawings, a hub 41 is pivoted on a stub shaft 42 extending from the base 38 and has a contact arm 43 for engaging with a contact arm 44 secured to the base 38 and electrically connected with the contact segment *f* as by means of the screw 45. A compression spring 46 extends between the stud 47 and the arm 48 on the hub and tends to yieldingly hold the hub 41 in position to disconnect the arm 43 from the contact arm 44 or to connect such arms. An insulating block 49 secured to the hub 41 extends upwardly into the path of the arm 50 extending downwardly from the hub 31 on shaft 29. Normally the hub 41 is held by the spring 46 with its arm 43 away from contact arm 44 and when the vehicle travels and the hub 31 is rotated the arm 50 will engage with the block 49 and will rotate the hub 41 against the pressure of the spring. When the contact arm 36 reaches the last segment *f*, the compression spring will pass the neutral line through the stud 47 and shaft 42 and will throw the hub 41 around to bring the contact arms 43 and 44 together, and as the hub 41 and the contact spring *p* are connected by a conductor *r* a shunt circuit will be closed from the contact *f* directly to the battery B and this circuit will thereafter be kept closed and the lamp illuminated independently of future movement of the contact arm, that is, the particular circuit is not longer under the control of the vehicle and is kept closed by the spring 46 which holds the contact arms 43 and 44 together. To open the circuit and restore it to the control of the vehicle a restoring push rod 51 is provided which extends through the lug 23 and is normally held in out position by the spring 52 away from the contact block 49. After swing of this block and closure of the contact arms 43 and 44 inward pressure on the bar 51 will cause it to engage with the contact block 49 and rotate the hub 41 to disconnect contact arms 43 and 44 and to swing the arm 48 above the neutral line of spring pressure, and the hub 41 will be rotated back to its normal position with the shunt circuit open. If the instrument were placed in the vehicle near the driver he could readily push the bar 51 to open the shunt circuit if at any time the high speed circuit were closed, and this would defeat the object of the invention. I therefore locate the device at some point of the vehicle which would make it necessary for the driver to leave the vehicle before he can actuate the re-setting bar 51. With this arrangement, if the machine has been traveling beyond a legal limit and the circuit of segment *f* is closed, the lamp *l* will indicate even though the driver slows up or comes to a stop, and before he can remove the evidence of his illegal speed he will have to stop and leave the machine before he can reset and open the held circuit. In case of accident this will enable officers or other witnesses to ascertain whether or not the driver has exceeded the speed limit.

Any suitable form of housing 53 may be provided for containing and protecting the operative parts.

I do not, of course, desire to be limited to the exact construction and arrangement shown and described as changes can be readily made which would still come within the scope of the invention. I claim as follows.

1. In a speed signaling system for vehicles, the combination of a contact arm free at all times to be moved in accordance with the speed of the vehicle, a plurality of contacts arranged to be successively engaged by said arm, electrical circuits successively closed by the engagement of the arm with said contacts and said circuits each including a speed signaling device, and means for maintaining closure of one of said circuits after primary closure thereof whereby the corresponding speed signaling device will be maintained in speed indicating condition.

2. In a speed signaling system for vehicles, the combination of a speed signaling device, an electrical circuit therefor, an actuating member free at all times to be moved by the running of the vehicle and in accordance with the speed thereof, contact mechanism in the path of said actuating member and actuated thereby to close said circuit only when the vehicle reaches a certain speed, and means for thereafter holding the contacts closed independently of the speed of the vehicle and the movement of said actuating member.

3. In a speed signaling system for vehicles, the combination of a contact arm connected to be moved in accordance with the speed of the vehicle, a plurality of contacts arranged to be successively engaged by the arm as the vehicle speed increases or decreases, electrical circuits connected with said arm and said contacts and adapted to be successively closed and opened as the speed increases or decreases, a speed signaling device in each circuit, contact mechanism controlled by the running of the vehicle to close one of said circuits independently of said arm and corresponding contact, and means for thereafter holding said contact mechanism to keep said circuit closed and its speed signaling device in signaling condition, said arm being free at all times to travel over said contacts.

4. In a speed signaling system for vehicles, the combination of a contact arm free at all times to be moved in accordance with the speed of the vehicle, a plurality of contacts arranged to be successively engaged by the arm as the speed of the vehicle increases or decreases, electrical circuits connected with said contacts and with said arm, a speed signaling device in each circuit, a holding circuit for one of said signal device circuits connected in bridge of the corresponding contact and said arm, and means controlled to close said holding circuit when the vehicle travels at corresponding speed and to hold it closed independently of said arm.

5. In a speed signaling system for vehicles, the combination with main contact mechanism comprising contacts and a contact arm connected to coöperate therewith in accordance with the speed of the vehicle, indicating circuits connected with said contact mechanism to be successively closed as the speed of the vehicle varies, and auxiliary contact mechanism controlled in accordance with the speed of the vehicle to close one of said circuits only when said vehicle reaches a speed corresponding with said circuit and to keep said circuit closed independently of the main contact mechanism.

In witness whereof I hereunto subscribe my name this 10th day of October, A. D., 1916.

F. BRUCE BLAKEMORE.